United States Patent Office 2,963,459
Patented Dec. 6, 1960

2,963,459

METAL BOROHYDRIDE CATALYSTS FOR AQUEOUS EMULSION POLYMERIZATIONS

Isadore Nicholson, Passaic, N.J., and Louis H. Howland, Watertown, Conn., assignors to United States Rubber Company, New York, N.Y., a corporation of New Jersey No Drawing. Filed Nov. 18, 1957, Ser. No. 696,958

14 Claims. (Cl. 260—83.5)

This invention relates to improvements in catalysts for aqueous emulsion polymerizations.

We have found that metal borohydrides are effective catalysts for the emulsion polymerization of unsaturated organic compounds (monomers) in the preparation of polymer latices. Polymers produced with these catalysts show superior heat ageing characteristics when compared with polymers produced with conventional persulfate catalysts.

The metal borohydrides that are employed as catalysts in the present invention are preferably the alkali-metal (lithium, sodium, potassium, rubidium and cesium) borohydrides. Other metal borohydrides that are sufficiently stable in water to allow polymerization to take place may also be employed as catalysts, such other metal borohydrides comprising the alkaline-earth (calcium, barium and strontium) borohydrides, and magnesium, thorium, mercury, gold and lead borohydrides. The metal borohydrides are reducing agents. Methods of preparing metal borohydrides are known. See articles by F. Stone in Quarterly Reviews 9, 196 (1955) and by Wiberg, Noth and Hartwinner in Zeitschrift Naturforschung 10b, 292 (1955). The amount of metal borohydride catalyst that may be used is not critical, and will usually be from 0.1 to 10 parts per 100 parts of polymerizable monomers.

The monomers to be polymerized may be emulsified in the conventional amount of water for aqueous emulsion polymerizations, generally 1 part of monomer to 0.5 to 3 parts of water, with the aid of conventional surface-active emulsifying agents. Since the metal borohydrides hydrolyze rapidly in acid medium, the aqueous emulsion of the polymerizable monomers is preferably non-acid, and generally alkaline, e.g. in a pH range from 7.5 to 13.5. The alkali-metal borohydrides may be used in admixture with water-soluble cobaltous, nickelous, manganous, ferrous and cuprous salts, such as the acetates, chlorides and sulfates, which salts are known to form precipitates with alkali-metal borohydrides. The metal borohydride catalysts of the present invention may be used in the presence or absence of oxygen, and if desired in the presence of an oxygen scavenger, such as pyrogallol. If desired, a conventional polymerization regulator, such as an aliphatic mercaptan having 6 to 18 carbon atoms ($C_6$ to $C_{18}$) or an aromatic mercaptan, may be used to regulate the chain length, generally in amount from 0.1 to 1 part per 100 parts of polymerizable monomers. In all such cases, the metal borohydride is considered the sole polymerization catalyst. The temperature of polymerization is not critical, and may be from 0° C. to 100° C., and also below 0° C. to —20° C. with an antifreeze such as methanol. Polymerizations at the lower temperatures give slower conversions of monomer to polymer. The optimum temperatures of polymerization appear to be from 40° C. to 60° C. After conversion of monomers to the desired amount of polymer, the polymerization may be stopped by the addition of a so-called shortstopping agent which prevents further polymerization of the monomers on subsequent standing of the latex or during removal of unreacted monomers. Examples of such shortstopping agents are hydroxylamine, dinitrochlorobenzene, di-tert-butyl hydroquinone and alpha-nitroso-beta-naphthol, generally used in conventional amount from 0.05 to 1 part per 100 parts of monomers in the polymerization recipe. Unreacted residual polymerizable monomers may be removed from the polymer latex, as by venting off monomers which are gaseous at atmospheric pressure, e.g. butadiene-1,3, and by steam distilling under reduced pressure, or so-called "stripping," residual higher boiling polymerizable monomers, e.g. styrene, and the thus recovered monomers may be utilized in subsequent polymerizations. The resulting polymer latex may be used as latex for various applications, or if desired, the polymer latex may be coagulated in conventional manner as by mixing with acid alone, e.g. sulfuric acid, or by addition of an alkali-metal salt, such as sodium chloride, and an acid such as sulfuric acid, to obtain solid polymer.

As in conventional emulsion polymerizations, the surface-active emulsifying agent may be one or a mixture of more than one anionic, ampholytic, and/or non-ionic surface-active agents. The amount of surface-active emulsifying agent used will generally be from 1 to 10 parts per 100 parts of polymerizable monomers.

The anionic surface-active agents that may be used are those having a general formula selected from the group consisting of R—COOM, R—SO₃M and R—OSO₃M, where M represents alkali-metal, ammonium or substituted ammonium (amine) radical, and R represents an organic radical containing at least one group having more than 8 carbon atoms. Examples of such anionic surface-active agents are:

(1) Soaps of fatty acids and abietic acid (rosin), including dehydrogenated, hydrogenated and disproportionated rosin soaps (e.g. sodium laurate, ammonium stearate, diethanolammonium oleate, sodium salt of disproportionated rosin acid).

(2) Alkyl sulfonates (e.g. dodecyl sodium sulfonate, cetyl potassium sulfonate).

(3) Alkyl sulfates (e.g. sodium dodecyl sulfate, sodium oleyl sulfate).

(4) Sulfonated ethers of long and short chain aliphatic groups (e.g. $C_{17}H_{33}$—O—$C_2H_4$—$SO_3$—Na).

(5) Sulfated ethers of long and short chain aliphatic groups (e.g. $C_{17}H_{33}$—O—$C_2H_4$—O—$SO_3Na$).

(6) Sulfonated alkyl esters of long chain fatty acids (e.g.

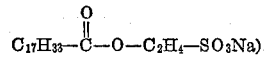

(7) Sulfonated glycol esters of long chain fatty acids (e.g.

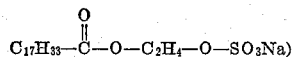

(8) Sulfonated alkyl substituted amides of long chain fatty acids (e.g.

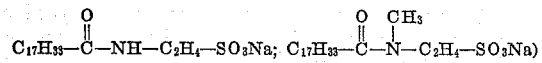

(9) Alkylated aryl sulfonates (e.g. isopropyl naphthalene sodium sulfonate; dodecyl benzene sodium sulfonate.

(10) Hydroaromatic sulfonates (e.g. tetrahydronaphthalene sodium sulfonate).

(11) Alkyl sulfosuccinates (e.g. dioctyl sodium sulfosuccinate).

(12) Aryl sulfonate-formaldehyde condensation products (e.g. condensation product of formaldehyde and sodium naphthalene sulfonate,

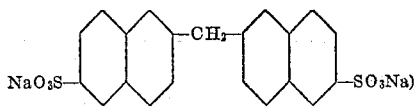

The ampholytic surface-active agents that may be used are the higher alkyl betaines (e.g. C-dodecyl betaine, C-cetyl betaine, C-oleyl betaine).

The non-ionic surface-active agents that may be used are:

(1) Monoethers of polyglycols with long chain fatty alcohols, such as reaction products of ethylene oxide or polyethylene glycol with a long chain fatty alcohol (e.g. reaction product of ethylene oxide and oleyl alcohol, viz:

where $n$ is 10 to 20).

(2) Monoesters of polyglycols with long chain fatty acids, such as reaction products of ethylene oxide or polyethylene glycol with a long chain fatty acid (e.g. reaction product of ethylene oxide or polyethylene glycol with oleic acid, viz:

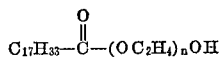

where $n$ is 10 to 20.

(3) Monoethers of polyglycols with alkylated phenols, such as reaction products of ethylene oxide or polyethylene glycol with an alkyl phenol (e.g. reaction product of ethylene oxide and isopropyl phenol, viz:

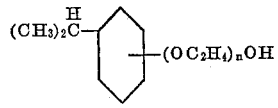

where $n$ is 10 to 20).

(4) Polyoxyethylene-polyoxypropylene glycols (e.g.

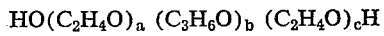

where the molecular weight of the compound is from 1,000 to 12,000, and the weight ratio of polyoxyethylene to polyoxypropylene groups in the molecule is in the range from 9:1 to 1:9).

(5) Partial esters of polyhydric alcohols with long chain monocarboxylic (fatty and/or resin) acids (e.g. glycerol monostearate, sorbitan trioleate).

(6) Partial and complete esters of long chain monocarboxylic (fatty and/or resin) acids with polyglycol ethers of polyhydric alcohols (e.g. tristearic acid ester of polyglycol ether of sorbitan, or so-called polyoxyethylene sorbitan tristearate; hexaoleic acid ester of polyglycol ether of sorbitol, or so-called polyoxyethylene sorbitol hexaoleate).

The present invention is applicable to catalyzing aqueous emulsion polymerizations of unsaturated organic compounds generally that are polymerizable in aqueous emulsion. Such unsaturated organic compounds may be monoolefines or conjugated diolefines or mixtures thereof. The polymerizable monoolefines are compounds which contain a $CH_2{=}C{<}$ group where at least one of the disconnected valences is attached to an electro-negative group, that is a group which substantially increases the electrical dissymmetry or polar character of the molecule. Examples of such monoolefines are aryl olefines, such as styrene, vinyl naphthylene, alpha methyl styrene, parachloro styrene, dichloro styrenes; alpha methylene carboxylic acids and their esters, nitriles and amides, such as acrylic acid, methacrylic acid, methyl acrylate, methyl methacrylate, ethyl acrylate, acrylonitrile, methacrylonitrile, methacrylamide; halogenated ethylenes, such as vinyl chloride and vinylidene chloride; alkyl vinyl ethers, such as methyl vinyl ether; alkyl vinyl ketones, such as methyl vinyl ketone; vinyl pyridines, such as 2-vinyl pyridine, 3-vinyl pyridine, 4-vinyl pyridine, 2-methyl-5-vinyl pyridine, 5-ethyl-2-vinyl pyridine, 2-methyl-6-vinyl pyridine, 2-ethyl-4-vinyl pyridine, 2,4-dimethyl-6-vinyl pyridine, and mixtures of these monoolefines. Such monoolefines polymerize to form synthetic resins. The polymerizable conjugated diolefines may be one or a mixture of more than one butadienes-1,3, for example, butadiene-1,3, (hereinafter sometimes called by its commonly accepted name "butadiene"), 2-methyl-butadiene-1,3 (isoprene), 2-chloro-butadiene-1,3 (chloroprene), 2,3-dimethyl butadiene-1,3, piperylene, which polymerize to form synthetic rubbers. The polymerizable material may be mixtures of one or more such butadienes-1,3 with one or more polymerizable monoolefines which contain a $CH_2{=}C{<}$ group and are copolymerizable with butadienes, such as the above referred monoolefines, to produce copolymers of such butadienes and monoolefines. The present invention is of particular interest in the polymerization of butadienes-1,3 and the polymerization of mixtures of butadienes-1,3 with up to 70% of such mixtures of such polymerizable monoolefines in the preparation of synthetic rubber latices, or so-called butadiene polymer synthetic rubber latices.

The following examples illustrate the invention. All parts and percentages referred to herein are by weight.

*Example 1*

The following formula was loaded oxygen-free into a 24 ounce capped bottle: 80 parts of butadiene, 20 parts of styrene, 180 parts of water, 5 parts of potassium myristate, 1 part of potassium borohydride, 2 parts of potassium hydroxide, and 0.5 part of dodecyl mercaptan. The loaded bottle was rotated in a constant temperature bath at 50° C. for 11 hours resulting in a latex with a conversion of about 70% monomers to rubbery polymer, after which 0.4 part of hydroxylamine shortstopper was added, residual butadiene monomer was vented off, and residual styrene monomer was stripped by steam distillation.

A similar run was made with 80 parts of butadiene, 20 parts of styrene, 180 parts of water, 5 parts of potassium myristate, 0.3 part of potassium persulfate, and 0.5 part of dodecyl mercaptan. After 11 hours polymerization at 50° C. to about 65% conversion, 0.4 part of hydroxylamine shortstopper was added, residual butadiene monomer vented off, and residual styrene monomer was stripped by steam distillation.

Air-dried film samples were made from the two latices and heat-aged for 2 to 24 hours in 2 hour increments in an oven in which air at 105° C. was circulated. All the heat-aged film samples from the latex prepared with the potassium borohydride catalyst were clear white. The heat-aged film samples from the latex prepared with the potassium persulfate were discolored toward yellow in the 2 to 10 hour heat-aged samples, were mottled yellow and white in the 12 to 18 hour heat-aged samples, and were yellow all over in the 20 to 24 hour heat-aged samples.

Samples of the two latices were placed in shallow dishes and exposed about ten inches under an infra red lamp which dried the samples in the first few minutes of treatment. In ten to twenty minutes, the dried films from the potassium persulfate catalyzed latex turned brown to black in color, and started to smoke. In the same time, the dried films from the potassium borohydride catalyzed latex remained pure white, without discoloration or smoking or other evidence of decomposition.

*Example 2*

In this and the following examples, the polymerizations of the specified formulations were carried out in 24 ounce capped bottles with agitation by rotating the bottles in a constant temperature bath at the stated temperature for the stated time, in a manner similar to the polymerizations in Example 1.

An oxygen-free formulation of 100 parts of butadiene, 180 parts of water, 7 parts of potassium myristate, 1 part of potassium borohydride and 2 parts of potassium hydroxide was polymerized at 50° C. for 22 hours, giving 74% conversion of monomer to polymer, after which 0.4 part of hydroxylamine was added, and unreacted butadiene was vented off. Polybutadiene synthetic rubber was recovered from the latex by conventional coagulation with sodium chloride and sulfuric acid.

Example 3

In this case, the polymerization was carried out in the presence of an oxygen scavenger, viz. pyrogallol.

A formulation of 100 parts of butadiene, 80 parts of water, 7 parts of potassium oleate, and 1.16 parts of pyrogallol was agitated overnight at 50° C. in a capped bottle. A second formulation of 100 parts of water, 1 part of potassium borohydride, 2 parts of potassium hydroxide, and 1.17 parts of pyrogallol was agitated overnight at 5° C. in a capped bottle. The contents of both bottles were combined oxygen-free and polymerized at 50° C. for 47 hours, giving 58% conversion, after which 0.4 part of hydroxylamine was added, residual butadiene monomer was vented off, and polybutadiene synthetic rubber coagulated in the latex with sodium chloride and sulfuric acid.

Example 4

In this case the polymerization was carried out in the presence of oxygen.

A formulation of 100 grams of butadiene, 180 grams of water, 7 grams of potassium myristate, 2 grams of potassium borohydride, and 0.5 gram of dodecyl mercaptan were capped in the 24 ounce polymerization bottle. Fifty cubic centimeters of oxygen were then introduced into the bottle with a hypodermic needle through the self-sealing cap. The formulation was polymerized at 50° C. for five hours, giving 74% conversion, after which 0.4 gram of hydroxylamine was added, residual butadiene monomer was vented off, and the rubber coagulated by treatment of the latex with sodium chloride and sulfuric acid.

Example 5

An oxygen-free formulation of 100 parts of butadiene, 180 parts of water, 4 parts of alkyl ($C_{12}$ to $C_{18}$) benzene sulfonate, 2 parts of sodium borohydride, and 2 parts of sodium hydroxide was polymerized at 50° C. for 22.5 hours, giving 50% conversion, after which 0.4 part of hydroxylamine was added, residual butadiene monomer was vented off, and the polybutadiene coagulated by treatment of the latex with sodium chloride and sulfuric acid.

Example 6

An oxygen-free formulation of 100 parts of butadiene, 180 parts of water, 5 parts of potassium Rubber Reserve soap of mixed fatty acids (lauric, myristic, palmitic, oleic and linoleic acids), 0.1 part of sodium borohydride, and 0.1 part of cobaltous chloride was polymerized at 50° C. for 23 hours, giving 33% conversion, after which 0.4 part of hydroxylamine was added, residual butadiene monomer was vented off, and the rubber coagulated by treatment of the latex with sodium chloride and sulfuric acid. The ratio of trans to vinyl isomeric forms in the polybutadiene was determined on the polybutadiene, and also on a polybutadiene polymerized under the same conditions but with a formulation of 100 parts of butadiene, 180 parts of water, 5 parts of the same potassium soap of mixed fatty acid, and 0.3 part of potassium persulfate catalyst. The trans/vinyl ratio for the borohydride catalyzed polybutadiene was 2.18 as compared to a trans/vinyl ratio for the conventional persulfate catalyzed polybutadiene of 2.90.

Example 7

An oxygen-free formulation of 100 parts of styrene, 180 parts of water, 5 parts of sodium Rubber Reserve soap of mixed fatty acids (lauric, myristic, palmitic, oleic and linoleic acids), 0.1 part of sodium borohydride, and 2 parts of sodium hydroxide was polymerized at 50° C. for 31 hours, giving 90% conversion, after which residual styrene monomer was stripped by steam distillation, and the polystyrene coagulated by treatment of the latex with sodium chloride and sulfuric acid.

Example 8

An oxygen-free formulation of 100 parts of styrene, 180 parts of water, 7 parts of a polyoxyethylene polyoxypropylene condensate having a molecular weight about 7500 and containing about 80% polyoxyethylene units and about 20% polyoxypropylene units (Pluronic F-68), 1 part of potassium borohydride, and 2 parts of potassium hydroxide, and the same formulation with the addition of 2 parts of the condensation product of tert. octyl phenol and ethylene oxide having about 10 oxyethylene units (Triton X-100), were each polymerized at 50° C. for 12 hours, giving about 60% conversion for the first formulation with the Pluronic F-68 non-ionic surface-active emulsifying agent and about 70% conversion for the second formulation with the mixture of Pluronic F-68 and Triton X-100 non-ionic surface-active emulsifying agents. At the end of the 12 hour polymerization, 0.4 part of hydroxylamine was added to each latex, residual styrene was stripped by steam distillation, and the styrene resin coagulated with sodium chloride and sulfuric acid.

Example 9

An oxygen-free formulation of 50 parts of styrene, 50 parts of methyl methacrylate, 180 parts of water, 5 parts of potassium Rubber Reserve soap of mixed fatty acids (lauric, myristic, palmitic, oleic and linoleic acids), 0.5 part of potassium borohydride, and 0.5 part of dodecyl mercaptan, was polymerized at 50° C. for 67 hours, giving 95% conversion, after which the styrene-methylmethacrylate copolymer resin was coagulated by treatment of the latex with sodium chloride and sulfuric acid.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method which comprises polymerizing at $-20°$ C. to 100° C. 100 parts of material selected from the group consisting of monoolefines which contain a $CH_2=C<$ group, said monoolefines being selected from the group consisting of aryl olefines, alpha methylene carboxylic acids and their esters, nitriles and amides, halogenated ethylenes, alkyl vinyl ethers, alkyl vinyl ketones, and vinyl pyridines, and butadienes-1,3 in aqueous emulsion in 50 to 300 parts of water in the presence of a catalyst consisting of 0.1 to 10 parts of a metal borohydride selected from the group consisting of alkali-metal, alkaline-earth metal, magnesium, thorium, mercury, gold and lead borohydrides.

2. The method which comprises polymerizing at $-20°$ C. to 100° C. 100 parts of material selected from the group consisting of monoolefines which contain a $CH_2=C<$ group, said monoolefines being selected from the group consisting of aryl olefines, alpha methylene carboxylic acids and their esters, nitriles and amides, halogenated ethylenes, alkyl vinyl ethers, alkyl vinyl ketones, and vinyl pyridines, and butadienes-1,3 in aqueous emulsion in 50 to 300 parts of water in the presence of a catalyst consisting of 0.1 to 10 parts of an alkali-metal borohydride.

3. The method which comprises polymerizing at $-20°$ C. to 100° C. 100 parts of material selected from the group consisting of monoolefines which contain a $CH_2=C<$ group, said monoolefines being selected from the group consisting of aryl olefines, alpha methylene carboxylic acids and their esters, nitriles and amides, halogenated ethylenes, alkyl vinyl ethers, alkyl vinyl ketones, and vinyl pyridines, and butadienes-1,3 in aqueous emulsion in 50 to 300 parts of water in the presence of a catalyst consisting of 0.1 to 10 parts of sodium borohydride.

4. The method which comprises polymerizing at $-20°$ C. to $100°$ C. 100 parts of material selected from the group consisting of monoolefines which contain a $CH_2=C<$ group, said monoolefines being selected from the group consisting of aryl olefines, alpha methylene carboxylic acids and their esters, nitriles and amides, halogenated ethylenes, alkyl vinyl ethers, alkyl vinyl ketones, and vinyl pyridines, and butadienes-1,3 in aqueous emulsion in 50 to 300 parts of water in the presence of a catalyst consisting of 0.1 to 10 parts of potassium borohydride.

5. The method which comprises polymerizing at $-20°$ C. to $100°$ C. 100 parts of monoolefines which contain a $CH_2=C<$ group, said monoolefines being selected from the group consisting of aryl olefines, alpha methylene carboxylic acids and their esters, nitriles and amides, halogenated ethylenes, alkyl vinyl ethers, alkyl vinyl ketones, and vinyl pyridines, in aqueous emulsion in 50 to 300 parts of water in the presence of a catalyst consisting of 0.1 to 10 parts of an alkali-metal borohydride.

6. The method which comprises polymerizing at $-20°$ C. to $100°$ C. 100 parts of monoolefines which contain a $CH_2=C<$ group, said monoolefines being selected from the group consisting of aryl olefines, alpha methylene carboxylic acids and their esters, nitriles and amides, halogenated ethylenes, alkyl vinyl ethers, alkyl vinyl ketones, and vinyl pyridines, in aqueous emulsion in 50 to 300 parts of water in the presence of a catalyst consisting of 0.1 to 10 parts of sodium borohydride.

7. The method which comprises polymerizing at $-20°$ C. to $100°$ C. 100 parts of monoolefines which contain a $CH_2=C<$ group, said monoolefines being selected from the group consisting of aryl olefines, alpha methylene carboxylic acids and their esters, nitriles and amides, halogenated ethylenes, alkyl vinyl ethers, alkyl vinyl ketones, and vinyl pyridines, in aqueous emulsion in 50 to 300 parts of water in the presence of a catalyst consisting of 0.1 to 10 parts of potassium borohydride.

8. The method which comprises polymerizing at $-20°$ C. to $100°$ C. 100 parts of butadiene-1,3 in aqueous emulsion in 50 to 300 parts of water in the presence of a catalyst consisting of 0.1 to 10 parts of an alkali-metal borohydride.

9. The method which comprises polymerizing at $-20°$ C. to $100°$ C. 100 parts of a mixture of butadiene-1,3 and up to 70% of the mixture of a compound which contains a $CH_2=C<$ group and which is copolymerizable with butadiene-1,3 in aqueous emulsion in 50 to 300 parts of water in the presence of a catalyst consisting of 0.1 to 10 parts of an alkali-metal borohydride.

10. The method which comprises polymerizing at $-20°$ C. to $100°$ C. 100 parts of a mixture of butadiene-1,3 and up to 70% of the mixture of a compound which contains a $CH_2=C<$ group and which is copolymerizable with butadiene-1,3 in aqueous emulsion in 50 to 300 parts of water in the presence of a catalyst consisting of 0.1 to 10 parts of sodium borohydride.

11. The method which comprises polymerizing at $-20°$ C. to $100°$ C. 100 parts of a mixture of butadiene-1,3 and up to 70% of the mixture of a compound which contains a $CH_2=C<$ group and which is copolymerizable with butadiene-1,3 in aqueous emulsion in 50 to 300 parts of water in the presence of a catalyst consisting of 0.1 to 10 parts of potassium borohydride.

12. The method which comprises polymerizing at $-20°$ C. to $100°$ C. 100 parts of a mixture of butadiene-1,3 and up to 70% of the mixture of styrene in aqueous emulsion in 50 to 300 parts of water in the presence of a catalyst consisting of 0.1 to 10 parts of an alkali-metal borohydride.

13. The method which comprises polymerizing at $-20°$ C. to $100°$ C. 100 parts of a mixture of butadiene-1,3 and up to 70% of the mixture of styrene in aqueous emulsion in 50 to 300 parts of water in the presence of a catalyst consisting of 0.1 to 10 parts of sodium borohydride.

14. The method which comprises polymerizing at $-20°$ C. to $100°$ C. 100 parts of a mixture of butadiene-1,3 and up to 70% of the mixture of styrene in aqueous emulsion in 50 to 300 parts of water in the presence of a catalyst consisting of 0.1 to 10 parts of potassium borohydride.

References Cited in the file of this patent

UNITED STATES PATENTS

| | | |
|---|---|---|
| 2,685,575 | Heiligmann et al. | Aug. 3, 1954 |
| 2,686,775 | Howard | Aug. 17, 1954 |
| 2,699,457 | Ziegler et al. | Jan. 11, 1955 |
| 2,717,248 | Vaughn et al. | Sept. 6, 1955 |
| 2,728,757 | Field et al. | Dec. 27, 1955 |
| 2,775,578 | Fisher et al. | Dec. 25, 1956 |
| 2,822,357 | Brebner et al. | Feb. 4, 1958 |

FOREIGN PATENTS

| | | |
|---|---|---|
| 783,744 | Great Britain | Sept. 25, 1957 |